(12) United States Patent
Delepierre et al.

(10) Patent No.: US 9,287,532 B2
(45) Date of Patent: Mar. 15, 2016

(54) ELECTRIC BATTERY AND MEANS FOR ENCAPSULATING SAME

(75) Inventors: Gabriel Delepierre, Fontaine (FR); Messaoud Bedjaoui, Grenoble Voreppe (FR)

(73) Assignee: COMMISSARIAT À L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 230 days.

(21) Appl. No.: 14/131,527

(22) PCT Filed: Jul. 5, 2012

(86) PCT No.: PCT/FR2012/000267
§ 371 (c)(1),
(2), (4) Date: Jan. 8, 2014

(87) PCT Pub. No.: WO2013/007889
PCT Pub. Date: Jan. 17, 2013

(65) Prior Publication Data
US 2014/0178743 A1 Jun. 26, 2014

(30) Foreign Application Priority Data
Jul. 8, 2011 (FR) .................................... 11 02160

(51) Int. Cl.
*H01M 2/02* (2006.01)
*H01M 2/08* (2006.01)
(Continued)

(52) U.S. Cl.
CPC .......... *H01M 2/0202* (2013.01); *H01M 2/0207* (2013.01); *H01M 2/0267* (2013.01); *H01M 2/0275* (2013.01); *H01M 2/08* (2013.01);
(Continued)

(58) Field of Classification Search
None
See application file for complete search history.

(56) References Cited

U.S. PATENT DOCUMENTS

2005/0147877 A1  7/2005  Tarnowski et al.
2007/0037060 A1  2/2007  Lee et al.
(Continued)

FOREIGN PATENT DOCUMENTS

CN     1957487 A     5/2007
CN   101030655 A     9/2007
(Continued)

OTHER PUBLICATIONS

Aug. 18, 2015 Office Action in Chinese Patent Application No. 201280043677.2.
(Continued)

*Primary Examiner* — Jeremiah Smith
(74) *Attorney, Agent, or Firm* — Oliff PLC

(57) ABSTRACT

An electric battery including a microbattery provided with first and second current collectors and an encapsulation device including an electrically-conductive and sealing layer formed by a matrix made of polymer material including electrically-conductive particles. First and second connection pads made of electrically-conductive material are respectively electrically connected to the first and second current collectors of the microbattery. The encapsulation device also includes an additional microbattery provided with first and second current collectors, arranged opposite to and separate from the microbattery by the sealing layer. The first and/or second current collectors of the additional microbattery are electrically connected, respectively, to the first and/or second connection pads via at least a portion of the electrically-conductive particles.

16 Claims, 5 Drawing Sheets

(51) Int. Cl.
  *H01M 6/18* (2006.01)
  *H01M 6/40* (2006.01)
  *H01M 10/04* (2006.01)
  *H01M 10/0525* (2010.01)
  *H01M 2/24* (2006.01)
  *H01M 2/26* (2006.01)
  *H01M 6/02* (2006.01)
  *H01M 10/052* (2010.01)
  *H01M 10/058* (2010.01)

(52) U.S. Cl.
  CPC  *H01M2/24* (2013.01); *H01M 2/26* (2013.01); *H01M 6/02* (2013.01); *H01M 6/185* (2013.01); *H01M 6/40* (2013.01); *H01M 10/0436* (2013.01); *H01M 10/052* (2013.01); *H01M 10/058* (2013.01); *H01M 10/0525* (2013.01); *Y02E 60/122* (2013.01); *Y02P 70/54* (2015.11); *Y10T 29/4911* (2015.01)

(56) References Cited

U.S. PATENT DOCUMENTS

| 2007/0091543 A1 | 4/2007 | Gasse et al. |
| 2009/0136839 A1* | 5/2009 | Kraznov et al. ............... 429/160 |
| 2011/0076550 A1* | 3/2011 | Liang et al. ................... 429/175 |
| 2011/0097625 A1 | 4/2011 | Bedjaoui et al. |

FOREIGN PATENT DOCUMENTS

| EP | 2 315 294 A1 | 4/2011 |
| WO | WO 2005/038957 A2 | 4/2005 |
| WO | WO 2005/067645 A2 | 7/2005 |

OTHER PUBLICATIONS

Sep. 5, 2012 International Search Report issued in International Application No. PCT/FR2012/000267 (with translation).

* cited by examiner

ELECTRIC BATTERY AND MEANS FOR ENCAPSULATING SAME

BACKGROUND OF THE INVENTION

The invention relates to an electric battery comprising a microbattery provided with first and second current collectors and with encapsulation means comprising a sealing and electrically-insulating layer formed by a polymer material matrix comprising electrically-conductive particles.

The invention also relates to a method of manufacturing such an electric battery.

STATE OF THE ART

Several solutions for encapsulating a microbattery, especially a lithium microbattery, have been provided in literature. These solutions may be divided in two families: thin-film encapsulation and encapsulation with an added element.

Thin-film encapsulation solutions comprise covering the microbattery with at least one thin film. Thin films may be based on different materials having electric, thermomechanical, and chemical characteristics compatible with the components and the operation of the microbattery. As an example, international patent application WO-2005/038957 discloses the encapsulation of a microbattery by a ceramic/metal bilayer directly deposited on the microbattery components. Although a ceramic material is chemically stable and generally forms an efficient electric insulator, its mechanical fragility is a major handicap for the adoption of this encapsulation mode.

Other combinations of materials have been tried to achieve a multilayer encapsulation, in particular, comprising a layer of polymer material directly deposited on the microbattery components. Polymer materials are advantageous in terms of structure since they enable to limit defects due to the substrate roughness and to absorb deformations of components of the microbattery during the use thereof. Further, the polymer material layer may advantageously comprise metal particles, forming a portion of the current collector of the microbattery. However, polymer materials are permeable to certain contaminants, which may react with the active portions of the microbattery. Thereby, an encapsulation in multilayers comprising a polymer material also requires the presence of an additional layer forming an efficient shield against contaminants.

As an example, patent application WO-2005/067645 discloses a multilayer encapsulation formed by a stack of at least one polymer layer covered with a metal layer. The method of manufacturing such an encapsulation however requires multiplying technological steps, which induces a significant production cost and time. The lateral protection of the microbattery remains little reliable against contaminants such as air and moisture.

Solutions of encapsulation with an added element comprise gluing a cap, for example, made of glass or again of a laminated polymer material. This type of encapsulation forms an efficient protection of lithium microbatteries. However, the protection cap is generally thick as compared with the total thickness of the microbattery. The system of encapsulation with an added element has a larger bulk for a constant surface capacity than thin-film encapsulation solutions.

SUMMARY OF THE INVENTION

In certain applications, particularly in electronics, there is a need to provide an electric battery which is easy to form, tight, and which has improved mechanical properties.

This need tends to be satisfied by providing an electric battery comprising a microbattery provided with first and second current collectors and encapsulation means comprising a sealing layer, electrically insulating and formed by a polymer material matrix comprising electrically-conductive particles. The electric battery comprises first and second connection pads made of electrically-conductive material which are, respectively, electrically connected to the first and second current collectors of the microbattery. The encapsulation means also comprise an additional microbattery provided with first and second current collectors, the additional microbattery being arranged opposite to and separate from the microbattery by the sealing layer. The first and/or second current collectors of the additional microbattery are electrically connected, respectively, to the first and/or second connection pads via at least a portion of the electrically-conductive particles.

A method of manufacturing such an electric battery comprising encapsulating the microbattery by arranging opposite thereto and by pressing the additional microbattery provided with the first and second current collectors with the microbattery which is previously provided with the first and second connection pads and covered with the sealing layer, is also provided. The pressing is carried out until the electric connection between the first and/or second connection pads and, respectively, the first and/or second current collectors of the additional microbattery is obtained via a portion of the electrically-conductive particles.

BRIEF DESCRIPTION OF THE DRAWINGS

Other advantages and features will become more clearly apparent from the following description of particular embodiments of the invention given for non-restrictive example purposes only and represented in the appended drawings, in which.

DESCRIPTION OF PARTICULAR EMBODIMENTS

Figure 1:
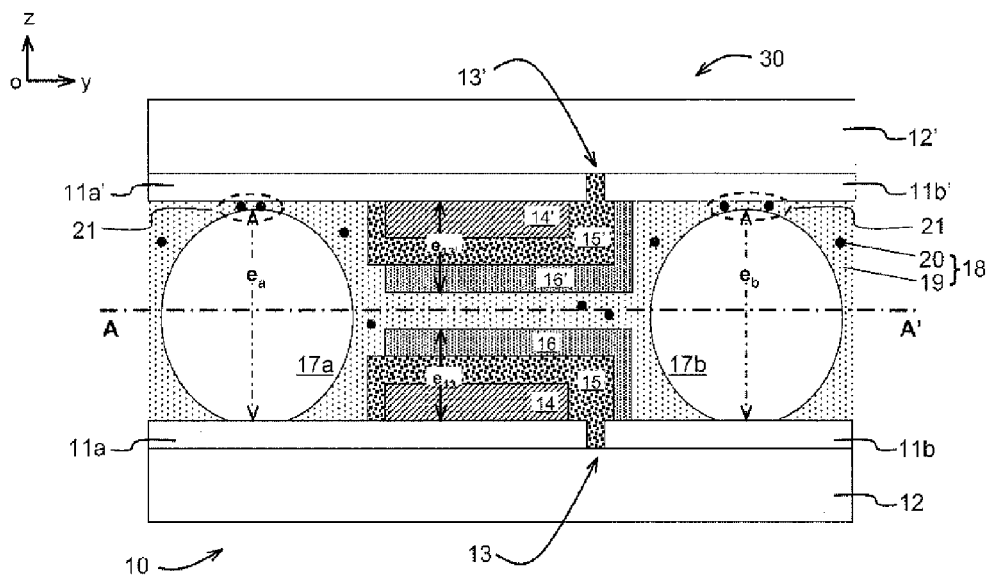
FIG. 1 schematically shows in cross-section view an electric battery according to a first specific embodiment of the invention.

According to a particular embodiment, shown in FIG. 1, an electric battery comprises a microbattery 10 provided with first 11a and second 11b current collectors arranged on a substrate 12. First 11a and second 11b current collectors are made of an electrically-conductive material, for example, titanium or tungsten. First 11a and second 11b current collectors appear in the form of coplanar layers respectively having a thickness of approximately 250 nm. Substrate 12 may conventionally be made of silicon, of nitrided silicon, or again of glass.

As shown in FIG. 1, microbattery 10 also comprises a stack 13 of thin solid layers forming the electrochemically-active portions of microbattery 10. Stack 13 is formed of first 14 and second 16 electrodes separated by an electrolyte 15.

First electrode 14 may be arranged to partially and uniquely cover one of the first 11a or second 11b current collectors of microbattery 10, for example, first collector 11a. First electrode 14 may be a cathode and first current collector 11a may be a cathode current collector. First electrode 14 preferably has a 1.5-µm thickness. First electrode 14 is for example made of a material selected from among titanium oxysulfide (TiOS), vanadium pentoxide ($V_2O_5$), and titanium disulfide ($TiS_2$).

As shown in FIG. 1, electrolyte 15 is arranged to cover a portion of current collector 11a, a portion of second current collector 11b, the entire first electrode 14, and the exposed portion of substrate 12 arranged between first 11a and second 11b current collectors. Solid electrolyte 15 may be an electrically-insulating material of high ion conductivity, for example, made of lithium phosphorus oxynitride (LiPON).

Second electrode 16 may be arranged to cover a major portion of solid electrolyte 15 and to be in contact with second current collector 11b. Second electrode 16 may be an anode and second current collector 11b may be an anode current collector. In particular, the second electrode contains a lithium compound. Advantageously, second electrode 16 has a thickness on the order of 3 µm.

First 17a and second 17b connection pads made of electrically-conductive material are respectively electrically connected to first 11a and second 11b current collectors of microbattery 10.

Figure 3:
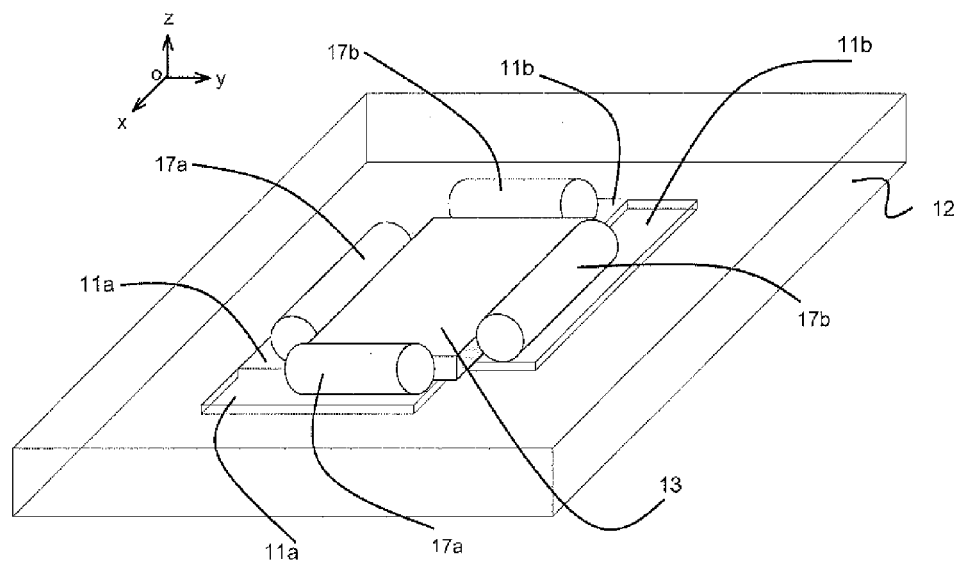
FIG. 3 schematically shows in perspective view a partial view of an electric battery according to another embodiment of the invention.

According to the specific embodiment shown in FIG. 1, first 17a and second 17b connection pads are respectively arranged on first 11a and second 11b current collectors of microbattery 10. First 17a and second 17b connection pads may have different geometric shapes, for example, a spherical shape. First 17a and second 17b connection pads are advantageously made of gold and have the shape of a horizontally-extending rotational cylinder having its two bases belonging to plane (yoz). Preferably, first 17a and second 17b connection pads are identical and have the shape of a horizontally-extending cylinder. The cylinder diameter corresponds to the thickness of first 17a and second 17b connection pads and is preferably in the range from 6 to 150 µm (FIG. 3).

The electric battery also comprises encapsulation means comprising an electrically-insulating and sealing layer 18. Sealing layer 18 is formed by a polymer material matrix 19, preferably electrically insulating, comprising electrically-conductive particles 20.

The encapsulation means also comprise an additional microbattery 30, provided with elements similar to those described for microbattery 10. In particular, additional microbattery 30 comprises first 11a' and second 11b' current collectors arranged on a surface of a substrate 12' provided with first 11a' and second 11b' current collectors. In the same way as for microbattery 10, a stack 13' of thin solid layers is arranged on the surface of substrate 12'. Stack 13' comprises an electrolyte 15' interposed between first 14' and second 16' electrodes which are in contact, respectively, with first 11a' and second 11b' current collectors. The elements forming stacks 13 and 13' may be identical or different.

As shown in FIG. 1, additional microbattery 30 is arranged opposite to and separated from microbattery 10 by sealing layer 18. First 17a and second 17b connection pads are covered with sealing layer 18 to be totally embedded in this layer. Preferably, matrix 19 is an adhesive matrix made of flexible polymer, for example, of epoxy/acrylate type. Electrically-conductive particles 20 for example have a spherical shape of diameter d. Particles 20 may be formed of glass spheres covered with silver. Advantageously, electrically-conductive particles 20 have a density ρ in matrix 19 smaller than $1/d^3$ and greater than 0. Preferably, sealing layer 18 is a layer of Anisotropic Conductive Film, ACF, for example a 3M 7371 ACF layer commercialized by 3M.

First 11a' and/or second 11b' current collectors of additional microbattery 30 are electrically connected, respectively, to first 17a and/or second 17b connection pads via at least a portion 21 of electrically-conductive particles 20. In other words, at least one of first 11a' and second 11b' current collectors is electrically connected to one of first 17a and second 17b connection pads. Indeed, matrix 19 comprises a portion 21 of electrically-conductive particles 20, arranged to provide an electric connection between first 11a' and/or second 11b' current collectors of additional microbattery 30 and, respectively, first 17a and/or second 17b connection pads. The other electrically-conductive particles 20 are dispersed in matrix 19, preferably to avoid being in contact with the elements of microbattery 10 and of additional microbattery 30.

Thus, the forming of the electric battery according to the invention advantageously enables to form a microbattery 10 efficiently encapsulated via an additional microbattery 30. The two microbatteries being arranged opposite to each other, each microbattery forms a protection for the other microbattery, in particular due to substrates 12 and 12' which form thick protection walls on the top and the bottom of the electric battery. Further, microbattery 10 and additional microbattery 30 are advantageously electrically interconnected. Such an ingenuous arrangement thus enables to simplify the forming of the electric battery, to improve the encapsulation of microbatteries, and to decrease manufacturing times and costs.

As shown in FIG. 1, first 11a and second 11b current collectors of microbattery 10 are, advantageously, symmetrical to first 11a' and second 11b' current collectors of additional microbattery 30 with respect to a plane of symmetry AA' placed between microbattery 10 and additional microbattery 30. Preferably, additional microbattery 30 is symmetrical to microbattery 10 with respect to plane AA' which is parallel to the surfaces of substrates 12 and 12' respectively comprising stacks 13 and 13'. Such a symmetry advantageously eases the alignment and the electric connection of microbattery 10 and of additional microbattery 30 and thus optimizes the device manufacturing time.

Microbattery 10 may be electrically connected to microbattery 30 in a parallel configuration. In other words, first current collectors 11a and 11a', respectively of microbattery 10 and of additional microbattery 30, have the same biasing. Similarly, second current collectors 11b and 11b', respectively of microbattery 10 and of additional microbattery 30, have the same biasing. According to this configuration, first 11a' and/or second 11b' current collectors of additional microbattery 30 are electrically connected, respectively, to first 17a and/or second 17b connection pads via at least a portion 21 of electrically-conductive particles 20.

"Biasing of a current collector" means the biasing or the type of the microbattery electrode with which it is in contact. If the electrode is positive, the current collector is called cathode current collector (or positively-biased collector) and if the electrode is negative, the collector connected to this electrode is called anode current collector (or negatively-biased collector).

The fact of electrically connecting in parallel microbattery 10 and additional microbattery 30 advantageously enables to form a tight electric battery having an increased surface capacitance. Indeed, the surface capacitance of the battery is equivalent, in this configuration, to the sum of the surface capacitances of microbattery 10 and of additional microbattery 30.

According to a variation, microbattery 10 may be electrically connected to microbattery 30 in a series configuration. In other words, first current collectors 11a and 11a', respectively of microbattery 10 and of additional microbattery 30, have different biasings. Similarly, second current collectors 11b and 11b', respectively of microbattery 10 and of additional microbattery 30, have different biasings. However, it should be ascertained not to connect one of first 17a and second 17b connection pads to avoid shorting the two microbatteries 10 and 30. To obtain this configuration, a layer of electrically-insulating material may be interposed, for example, between portion 21 of electrically-conductive particles 20 and respectively one of first 11a' or second 11b' current collectors of additional microbattery 30. According to this configuration, only one of first 11a' and second 11b' current collectors of additional microbattery 30 is electrically connected to one of first 17a and second 17b connection pads via at least a portion 21 of electrically-conductive particles 20.

Thus, the electric battery comprising microbattery 10 and additional microbattery 30 electrically connected in series advantageously enables to modulate the output voltage of the electric battery.

As shown in FIG. 1, first 17a and second 17b connection pads advantageously have thicknesses $e_a$ and $e_b$ greater than thickness $e_{13}$ of stack 13. Thickness $e_{13}$ is the thickness of the portion of stack 13 which projects with respect to first current collector 11a. "Thickness of a connection pad" means the largest dimension of the connection pad along axis (oz). Preferably, thicknesses $e_a$ and $e_b$ are at least twice greater than thickness $e_{13}$ of stack 13. Thicknesses $e_a$ and $e_b$ are also selected according to the dimensions of the different elements of the two microbatteries, 10 and 30, to avoid any possible contact between stacks 13 and 13'.

Figure 2:
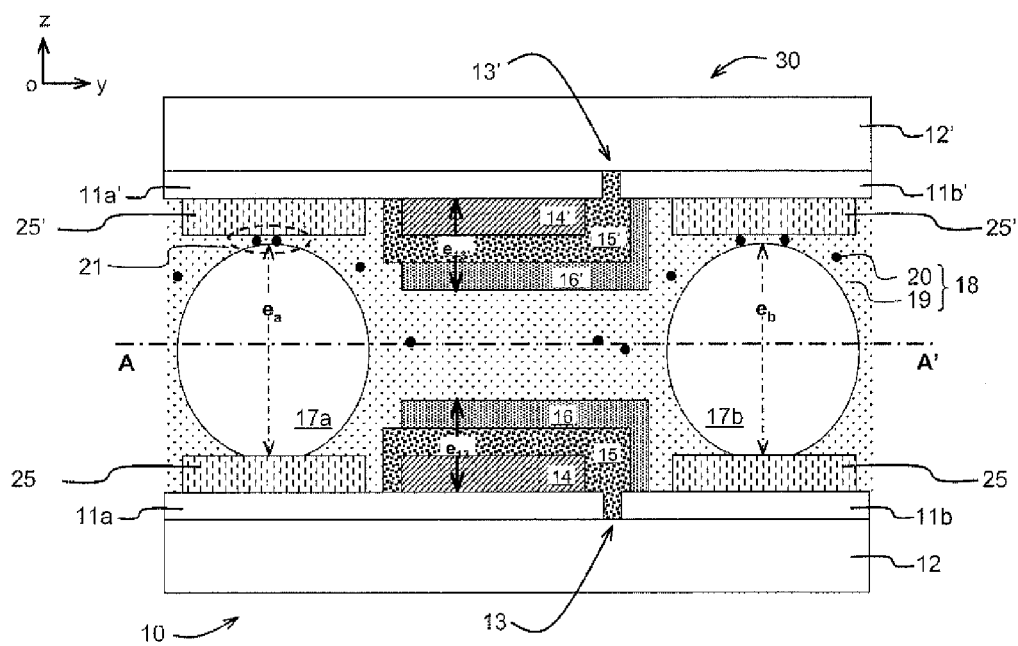
FIG. 2 schematically shows in cross-section view an electric battery according to a second specific embodiment of the invention.

According to a specific embodiment shown in FIG. 2, the electric battery advantageously comprises at least one bonding layer 25 interposed between first 17a or second 17b connection pads and, respectively, first 11a or second 11b current collectors of microbattery 10. Advantageously, the electric battery also comprises at least one bonding layer 25' interposed between a portion 21 of electrically-conductive particles 20 and respectively one of first 11a' or second 11b' current collectors of additional microbattery 30. Preferably, bonding layers 25 and 25' are independently made of aluminum, copper, or gold. Bonding layers 25 and 25' each have a thickness in the range from 250 nm to 1,000 nm. Bonding layers 25 and 25' enable to improve the bonding of first 17a or second 17b connection pads. Respective thicknesses $e_a$ and $e_b$ of first 17a and second 17b connection pads are selected to obtain reliefs of first 17a and second 17b connection pads greater than those of stack 13. Thicknesses $e_a$ and $e_b$ are thus adjusted to avoid any possible contact between stacks 13 and 13' and to obtain reliefs forming barriers facing the lateral walls of stack 13 and extending beyond second electrode 16.

According to a specific embodiment shown in FIG. 3, first 17a and second 17b connection pads laterally delimit stack 13 of microbattery 10. In particular, each connection pad 17a and 17b may be formed of at least two cylindrical elements made of conductive material to provide as many cylindrical elements as there are lateral walls of stack 13. Such an arrangement of first 17a and second 17b connection pads advantageously enables to laterally protect stack 13. According to the combination of this specific embodiment with the previous embodiment, first and second connection pads 17a and 17b and bonding layer(s) 25 altogether form the lateral protection of stack 13. In other words, according to this specific embodiment, bonding layer 25 and first 17a and second 17b connection pads laterally delimit stack 13.

This also enables to provide a lateral protection of stack 13' (not shown in FIG. 3) of additional microbattery 30, arranged in front of stack 13. Further, this arrangement of first 17a and second 17b connection pads enables to homogenize the electric field lines and thus to improve the performance of the electric battery.

According to an alternative embodiment, at least one of first 17a and second 17b connection pads comprises a planar connection area in contact with portion 21 of electrically-conductive particles 20. "Connection area" means the area of the connection pad which is in contact with portion 21 of particles 20. This area thus provides an electric connection between said pad and one of the current collectors of additional microbattery 30. Preferably, each of the two connection pads 17a and 17b also comprises a planar connection area. Such a structural characteristic advantageously enables to provide a perennial high-performance electric contact between first 17a or second 17b connection pad and portion 21 of electrically-conductive particles 20.

According to a specific embodiment, a method of manufacturing an electric battery such as described hereabove comprises forming a microbattery 10 according to any known method. Microbattery 10 comprises a substrate 12, first 11a and second 11b current collectors, a stack 13 and, advantageously, bonding layers 25.

Figure 4:
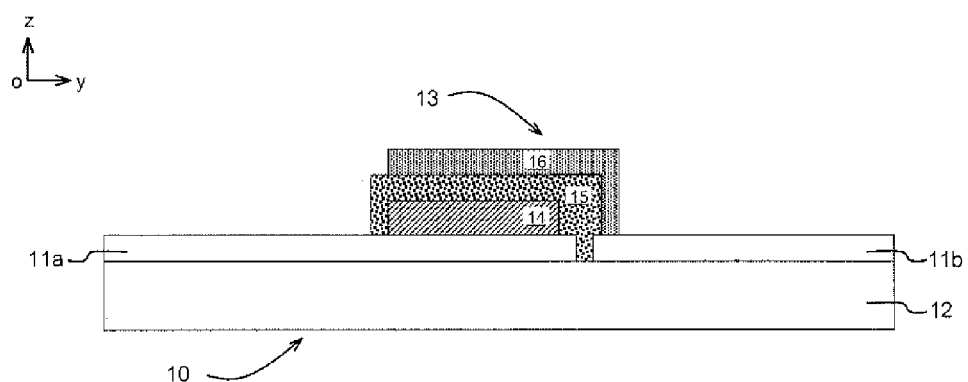
FIGS. 4 to 9 schematically show in cross-section view successive steps of a method of manufacturing an electric battery according to a specific embodiment of the invention.

As shown in FIG. 4, first 11a and second 11b current collectors are formed on a surface of a substrate 12 according to any known method, for example, by thin film deposition, such as a physical vapor deposition, noted PVD, or a chemical vapor deposition, noted CVD. First 11a and second 11b current collectors are structured according to any known method, preferably by photolithography, to be coplanar and spaced apart from each other. Preferably, first 11a and second 11b current collectors are made of titanium and have a thickness of approximately 250 nm.

A stack 13 of thin solid layers forming the electrochemically active portions of microbattery 10 is formed on the surface of substrate 12 comprising first 11a and second 11b current collectors. Stack 13 comprises a first electrode 14, an electrolyte 15, and a second electrode 16.

First electrode 14 is formed to partially and only cover one of first 11a or second 11b current collectors of microbattery 10, for example, first collector 11a. First electrode 14 is arranged horizontally between an uncovered portion of first collector 11a and second collector 11b. First electrode 14 is formed according to any known method, for example, by vacuum deposition or by cathode sputtering. It may be a cathode and first current collector 11a may be a cathode current collector. Preferably, first electrode 14 has a thickness of approximately 1.5 μm.

Electrolyte 15 is formed to cover a portion of current collector 11a, a portion of second current collector 11b, the entire first electrode 14, and the exposed portion of substrate 12 arranged between first 11a and second 11b current collectors. Solid electrolyte 15 is for example deposited by PVD and has a thickness of approximately 1.5 μm.

Second electrode 16 is formed to cover a major portion of solid electrolyte 15 to form stack 13 and to be in contact with second current collector 11b. Second electrode 16 may be made of lithium and formed by high-vacuum deposition by heating the metal lithium. Second electrode 16 preferably has a thickness of approximately 3 μm.

Figure 5:
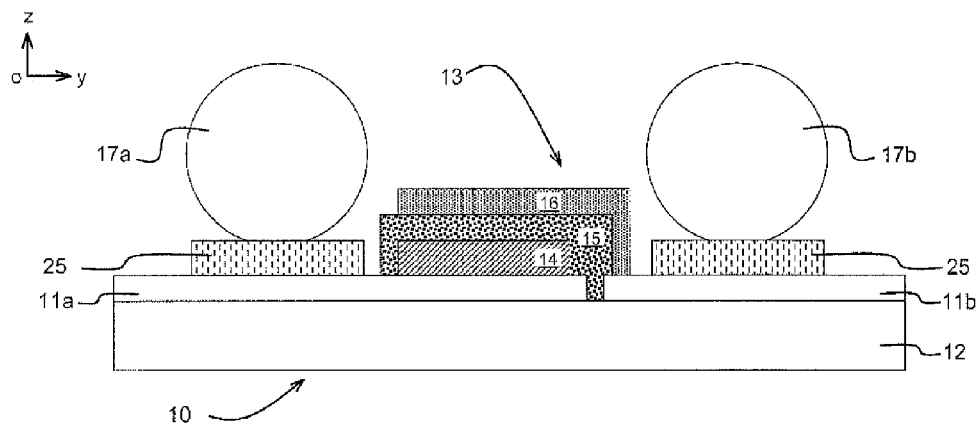

As shown in FIG. 5, a bonding layer 25 is advantageously formed on first 11a or second 11b current collector. Preferably, a bonding layer 25 is formed on each of first 11a and second 11*b* current collectors of microbattery 10. Each bonding layer 25 is formed by any known method, for example, by PVD or by vacuum deposition. Bonding layers 25 preferably have a thickness ranging between 250 nm and 1,000 nm. Bonding layers 25 are arranged so that stack 13 is horizontally arranged between the two bonding layers 25.

Figure 8:
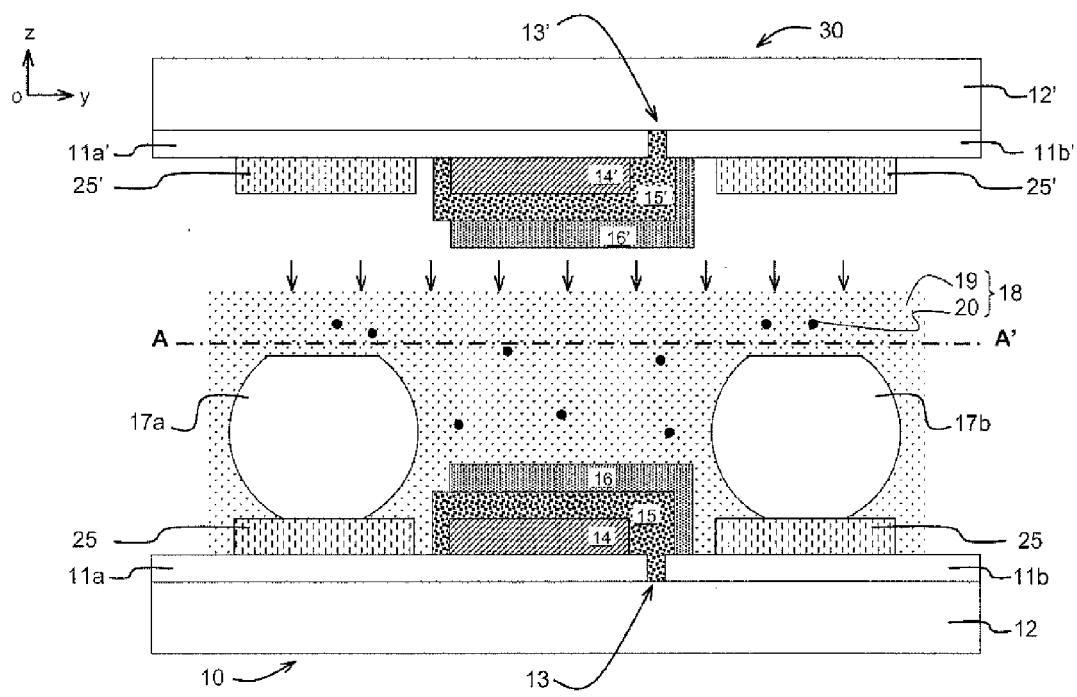

Similarly, an additional microbattery 30 is formed according to any known method. Additional microbattery 30 comprises elements similar to those described for microbattery 10 and formed in a similar way. Thus, additional microbattery 30 comprises first 11*a*' and second 11*b*' current collectors, a stack 13' and, advantageously, bonding layers 25', all this on a surface of a substrate 12'. Stack 13' forming the electrochemically-active portions comprises a first electrode 14', an electrolyte 15', and a second electrode 16' (FIG. 8).

As shown in FIG. 5, first 17*a* and second 17*b* connection pads are formed on one of the two microbatteries 10 and 30, for example, microbattery 10. First 17*a* and second 17*b* connection pads are formed to be electrically connected with, respectively, first 11*a* and second 11*b* current collectors of microbattery 10. They may be formed either directly on first 11*a* and second 11*b* current collectors of microbattery 10, or on bonding layers 25. The connection pads are advantageously made of aluminum or gold.

First 17*a* and second 17*b* connection pads may be formed by a wire bonding technique. Advantageously, first 17*a* and second 17*b* connection pads may be formed by an ultrasonic wedge bonding technique. This technique enables to create a connection between a connection pad, for example, 17*a* or 17*b*, and the area to be connected, for example, one of bonding layers 25, by combining pressure and ultrasonic vibrations. The ultrasonic wedge bonding technique can be considered as a cold soldering. Indeed, the ultrasonic energy causes a softening of the connection pad similar to the effect obtained by a temperature rise. It is a wire bonding technique that can be performed at ambient temperature. The ultrasonic wedge bonding technique is compatible with the method of forming lithium microbatteries, which has a melting temperature close to 180° C.

This technique is preferred to other wire bonding techniques such as ball bonding, which requires maintaining the area to be connected at a higher temperature, in the range from 160° C. to 200° C. Further, the ultrasonic wedge bonding technique is a cold soldering, which enables to avoid the forming of intermetallic compounds. Thus, electric connections capable of interconnecting microbatteries with electric resistances in the range from 0.1 to 1 Ohm can be obtained.

Advantageously, each connection pad 17*a* or 17*b* has the shape of a cylinder laid on a plane parallel to the main surface of substrate 12 provided with first 11*a* and second 11*b* current collectors. First 17*a* and second 17*b* cylindrical connection pads are arranged to surround stack 13. Thereby, first 17*a* and second 17*b* connection pads form a lateral protection barrier for the electro-chemically-active portions of microbattery 10. Further, they provide a better homogeneity of the electric field lines in microbattery 10 due to the cylindrical shape and to a greater contact area between the cylindrical connection pads and bonding layers 25.

Figure 6:
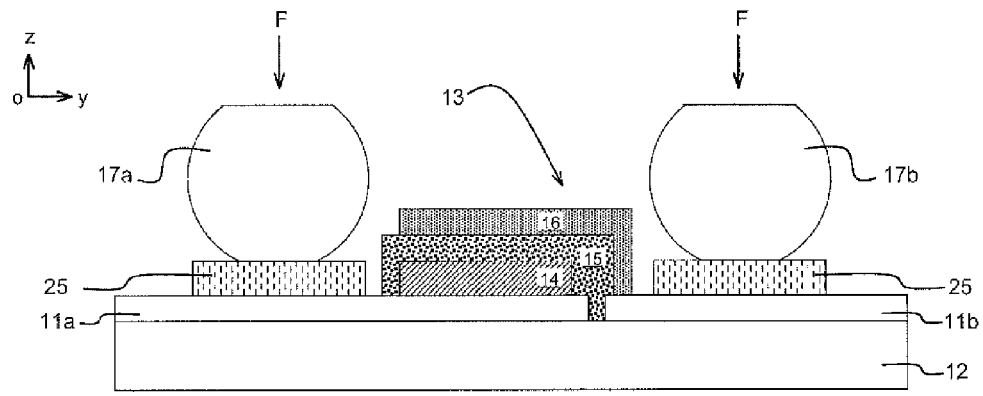

As shown in FIG. 6, the manufacturing method then comprises a step of leveling by pressing first 17*a* or second 17*b* connection pad. This step of leveling by pressing is preferably performed under a pressure F in the range from 100 MPa to 400 MPa. The pressing step enables to form a planar connection area on each of the first 17*a* and second 17*b* connection pads and to improve, particularly, the quality of the electric interface.

Figure 7:
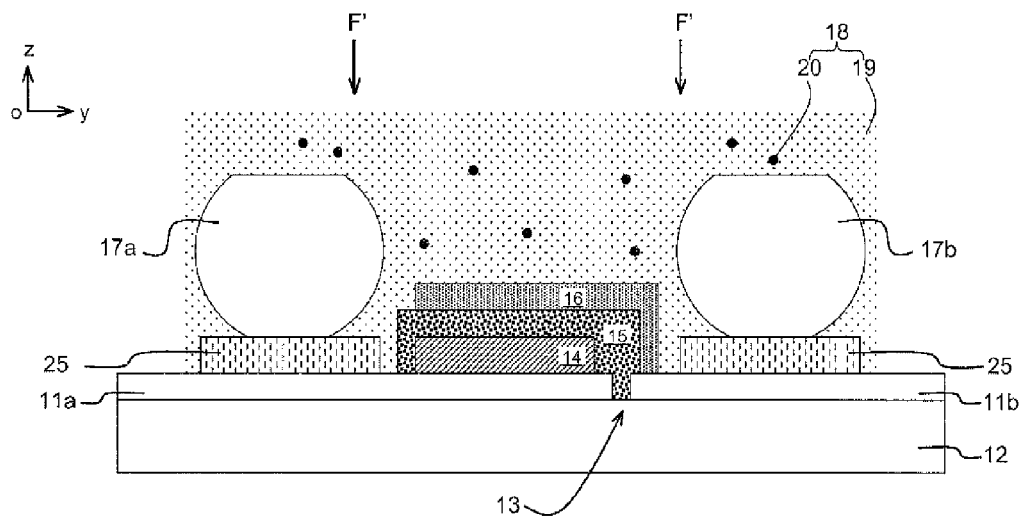

As shown in FIG. 7, after the forming, and optionally the pressure leveling of the connection pads, microbattery 10 provided with first and second connection pads 17*a* and 17*b* is covered with a sealing layer 18, for example, a layer of ACF anisotropic conductive material. Sealing layer 18 is formed by an electrically insulating matrix 19 made of polymer material comprising electrically-conductive particles 20. Sealing layer 18 is arranged on microbattery 10 to embed first 17*a* and second 17*b* connection pads. Preferably, matrix 19 is an adhesive matrix made of flexible polymer, generally of polymer of epoxy/acrylate type. Matrix 19 is electrically insulating, preferably, having a resistivity in the range from $10^8$ to $10^{13}$ Ohms·cm. For example, a 3M 7371 ACF may be used as a sealing layer 18. To enable sealing layer 18 to better cover and embed the elements of microbattery 10 and connection pads 17*a* and 17*b*, sealing layer 18 may be submitted to a thermal treatment at a 90° C. temperature for 1 s and/or a pressure F' in the range from 1 to 15 kg/cm².

As shown in FIG. 8, additional microbattery 30, provided with first 11*a*' and second 11*b*' current collectors, is arranged in front of first microbattery 10. The latter is previously provided with first and second connection pads 17*a* and 17*b* and covered with sealing layer 18. First and second current collectors 11*a*' and 11*b*' of additional microbattery 30 are arranged to be respectively in front of first 17*a* and second 17*b* connection pads when the two microbatteries 10 and 30 are placed opposite to each other. If additional microbattery 30 comprises bonding layers 25', each bonding layer 25' is arranged opposite to first 17*a* or second 17*b* connection pad.

Advantageously, first 11*a* and second 11*b* current collectors of microbattery 10 are formed to be symmetrical to first and second current collectors 11*a*' and 11*b*' of additional microbattery 30 with respect to a plane AA' parallel to substrate 12. Preferably, the two microbatteries 10 and 30 are symmetrical with respect to this plane. Such symmetries advantageously provide an easy and high-performance alignment between microbattery 10 and additional microbattery 30, and make the encapsulation step easier.

Figure 9:
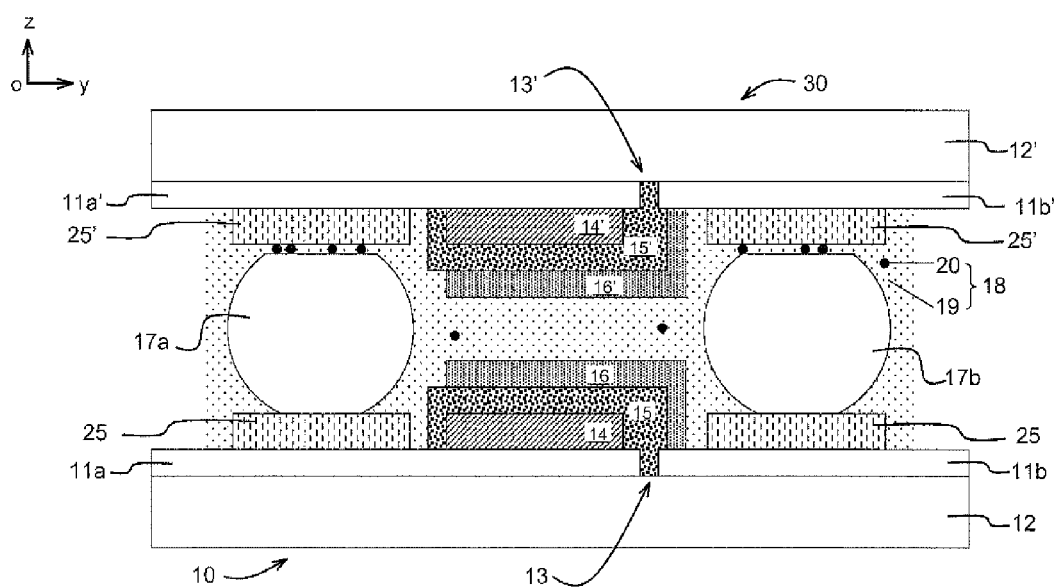

As shown in FIG. 9, additional microbattery 30, provided with first and second current collectors 11*a*' and 11*b*', is then pressed against microbattery 10. The installation and the pressing may be performed simultaneously or successively. The performing of these steps also provides the electric connection of the two microbatteries 10 and 30. "Electric connection between the two microbatteries 10 and 30" means an electric connection between the connection pads and the current collectors of additional microbattery 30. The pressure is applied to microbattery 10 or to additional microbattery 30 to bring them towards each other. During this encapsulation step, the pressing is performed until an electric connection is obtained between first 17*a* and/or second 17*b* connection pads and, respectively, first 11*a*' and second 11*b*' current collectors. This electric connection is ensured by a portion 21 of electrically-conductive particles 20 of sealing layer 18 and possibly bonding layers 25' of additional microbattery 30. As an example, for an electrically-insulating and sealing layer 18 formed by the 3M 7371 ACF, the pressure may be in the range from 10 to 20 kg/cm², preferably around 15 kg/cm². This pressure is selected to ensure the electric connection while avoiding crushing particles 20 of sealing layer 18. During the step of encapsulation of microbattery 10, a thermal treatment is advantageously carried out, to take matrix 19 to a temperature lower than 180° C., which is a temperature close to the melting temperature of lithium. Preferably, such a thermal treatment is carried out at a temperature of approximately 140° C. for 20 s.

Preferably, electrically-conductive particles 20 of sealing layer 18 are initially spherical with a diameter d. As an example, they are formed of glass balls covered with silver. The concentration of particles 20 present in matrix 19 is selected to avoid any percolation during the encapsulation step described hereabove. This phenomenon of percolation of particles 20 may generate a short-circuit between stacks 13 and 13', which adversely affects the electric battery comprising microbattery 10 and additional microbattery 30.

To avoid the percolation phenomenon, particles 20 of sealing layer 18 advantageously have a diameter d and a density ρ according to the following formula: $0<\rho<1/d^3$, before the electric connection. This characteristic of sealing layer 18 provides an electric insulation along direction (oy) parallel to substrate 12 on assembly of the two microbatteries 10 and 30, and along direction (oz) in the regions arranged between first and second connection pads 17a and 17b. Thereby, the two stacks 13 and 13' remain electrically insulated after the pressing step. Preferably, density ρ of electrically-conductive particles 20 in matrix 19 follows formula: $1/27*d^3<\rho<1/8*d^3$, before the electric connection. This range of densities ρ advantageously enables to improve the moisture barrier capacity. As an example, a 3M 7371 ACF polymer forming matrix 19 has a moisture barrier value in the order of $10^{-1}$ g/m²/day. The introduction, into this polymer, of particles having a 10-μm diameter and a density in the range from $1/27*d^3$ to $1/8*d^3$ enables to improve the value of the moisture barrier by up to two orders of magnitude.

Further, the pressing of microbatteries 10 and 30 results in a concentration of particles 20 in the vicinity of the largest reliefs along (oz), that is, between first 17a and second 17b connection pads and bonding layers 25' (FIG. 9). A manufacturing method using such an encapsulation step is particularly adapted to a topology of a microbattery specifically having connection pads forming large reliefs.

Indeed, conversely to a conventional microbattery having an electric connection pad thickness smaller than 1 μm, first 17a and second 17b connection pads have thicknesses $e_a$ and $e_b$ greater than thickness $e_{13}$ of the projecting portion of stack 13. Thicknesses $e_a$ and $e_b$ may be in the range from 6 to 150 μm, preferably equal to approximately 25 μm. Bonding layers 25 and first and second connection pads 17a and 17b are formed to create large reliefs along axis (oz). Thus, a portion of particles 20 may be concentrated between first 17a and second 17b connection pads and bonding layers 25' during the pressing step with a view to the encapsulation of microbattery 10. Thicknesses $e_a$ and $e_b$ are also selected to avoid any contact between stacks 13 and 13' during the pressing step.

As shown in FIG. 9, portion 21 of particles 20 trapped between the connection pads and bonding layers 25' provides an electric connection between, respectively, first 17a and second 17b connection pads and first 11a' and second 11b' current collectors of additional microbattery 30. To ease such a trapping of portion 21 of particles 20, diameter d of electrically-conductive particles 20, initially spherical, is smaller than the smallest dimension of first 17a and second 17b connection pads. Thus, microbattery 10 and additional microbattery 30 are electrically connected via first 17a and second 17b connection pads and portion 21 of particles 20.

The method of manufacturing the electric battery according to the invention enables to perform a high-performance encapsulation of microbattery 10 and of additional microbattery 30. Indeed, each microbattery protects the other due to substrates 12 and 12' which form thick barriers, which are thus efficient above and under stacks 13 and 13'. Further, first 17a and second 17b connection pads and sealing layer 18 form an efficient lateral shield protecting the electric battery on the sides. It has thus been possible to obtain moisture barrier values smaller than $10^{-3}$ g/m²/day, compatible with the requirements of microbattery technology.

The above-described manufacturing method is also remarkable in that it is easy to form and enables to perform an active encapsulation of two microbatteries at a time. The manufacturing method according to the invention advantageously enables to electrically connect the two microbatteries together by means of connection pads, which also provide a lateral protection of the two microbatteries. Further, the connection pads may comprise a planar area thus allowing an easy, high-performance, and perennial assembly and encapsulation of the two microbatteries.

The invention claimed is:

1. Electric battery comprising:
   a microbattery provided with first and second current collectors;
   first and second connection pads made of electrically-conductive material and respectively electrically connected to the first and second current collectors of said microbattery;
   a sealing layer, formed by a polymer material matrix comprising a plurality of electrically-conductive particles, the sealing layer being an electrically-insulating layer; and
   an additional microbattery provided with first and second current collectors, arranged opposite to and separate from said microbattery by the sealing layer;
   wherein at least a portion of individual particles of the plurality of electrically-conductive particles contact both i) one of the first and second connection pads of the microbattery and ii) a corresponding one of the first and second current collectors of the additional microbattery, thereby electrically connecting the microbattery to the additional microbattery.

2. Electric battery according to claim 1, comprising a bonding layer interposed between the first or second connection pad and respectively the first or second current collector of the microbattery.

3. Electric battery according to claim 1, wherein the microbattery comprises a stack formed by first and second electrodes separated by an electrolyte, and wherein the first and second connection pads laterally delimit said stack.

4. Electric battery according to claim 1, wherein the first and second current collectors of the microbattery are symmetrical to the first and second current collectors of the additional microbattery with respect to a plane of symmetry arranged between said microbattery and said additional microbattery.

5. Electric battery according to claim 1, wherein at least one of first and second connection pads comprises a planar connection area in contact with said portion of individual particles of the plurality of electrically-conductive particles.

6. Electric battery according to claim 3, wherein the thicknesses of the first and second connection pads are at least greater than twice the thickness of said stack.

7. Electric battery according to claim 1, wherein the first current collectors, respectively, of said microbattery and of said additional microbattery are configured to have the same biasing.

8. Electric battery according to claim 1, wherein the first current collectors, respectively of said microbattery and of said additional microbattery are configured to have different biasings.

9. Method of manufacturing an electric battery comprising a step of encapsulating a microbattery provided with first and second current collectors by arranging opposite thereto and by pressing an additional microbattery provided with first and second current collectors with said microbattery previously provided with first and second connection pads and covered with an electrically-insulating and sealing layer, formed by a polymer material matrix comprising electrically-conductive particles, to obtain an electric connection between the first and/or second connection pads of the microbattery and respectively the first and/or second current collectors of said additional microbattery via a portion of the electrically-conductive particles, and wherein the electric connection is provided by locally compressing the electrically-insulating and sealing layer between the first and/or second connection pads of the microbattery and respectively the first and/or second current collectors of said additional microbattery, thereby transforming a portion of the electrically-insulating and sealing layer from an electrically insulating state to an electrically conductive state.

10. Method according to claim 9, wherein the first and second connection pads are formed by an ultrasonic wedge bonding technique.

11. Method according to claim 9, comprising a step of leveling by pressing the first or second connection pads before covering said microbattery provided with the first and second connection pads by the electrically-insulating and sealing layer.

12. Method according to claim 11, wherein the pressure leveling step is performed under a pressure in the range from 100 MPa to 400 MPa.

13. Method according to claim 9, wherein the polymer material matrix is taken to a temperature lower than 180° C., during the encapsulation step.

14. Method according to claim 9, wherein the electrically-conductive panicles of the electrically-insulating and sealing layer have, before the electric connection, a diameter d and a density $\rho$ according to the following formula: $0<\rho<1/d^3$.

15. Method according to claim 9, wherein a diameter d and a density $\rho$ of the electrically-conductive particles in the polymer material matrix follow the formula: $1/(27*d^3)<\rho<1/(8*d^3)$, before the electric connection.

16. Method according to claim 9, wherein the electrically conductive particles of the electrically-insulating and sealing layer have a diameter d smaller than the smallest dimension of the first and second connection pads.

* * * * *